(12) United States Patent
Martino González et al.

(10) Patent No.: US 8,577,657 B2
(45) Date of Patent: Nov. 5, 2013

(54) METHODS FOR ESTIMATING THE EFFECT OF VARIATIONS OF DESIGN VARIABLES ON THE WEIGHT OF AN AIRCRAFT COMPONENT

(75) Inventors: Esteban Martino González, Madrid (ES); Jorge Antonio Bes Torres, Madrid (ES)

(73) Assignee: Airbus Operations S.L., Madrid (ES)

( * ) Notice: Subject to any disclaimer, the term of this patent is extended or adjusted under 35 U.S.C. 154(b) by 217 days.

(21) Appl. No.: 12/397,028

(22) Filed: Mar. 3, 2009

(65) Prior Publication Data

US 2010/0169054 A1  Jul. 1, 2010

(30) Foreign Application Priority Data

Dec. 29, 2008  (ES) .................................. 200803725

(51) Int. Cl.
 G06G 7/48 (2006.01)
 G06F 7/60 (2006.01)
 G06F 17/10 (2006.01)
 B64C 1/00 (2006.01)
 B64C 30/00 (2006.01)

(52) U.S. Cl.
 USPC ............................... 703/8; 703/2; 244/117 R

(58) Field of Classification Search
 USPC .......................................... 703/2, 8; 244/117
 See application file for complete search history.

(56) References Cited

U.S. PATENT DOCUMENTS

| 2007/0108347 A1* | 5/2007 | Sankrithi et al. ............... 244/119 |
| 2008/0005887 A1* | 1/2008 | Glenn et al. ..................... 29/523 |
| 2009/0083014 A1* | 3/2009 | Schallert .......................... 703/6 |

FOREIGN PATENT DOCUMENTS

| EP | 0 375 435 A2 | 6/1990 |
| WO | 2007/074084 A2 | 7/2007 |
| WO | 2007/130545 | 11/2007 |

OTHER PUBLICATIONS

Sanfeliu, Ester Cornellas, "Treball de Fi de Carrera: Certification Calculations of the Torsion Box of an Aircraft's Horizontal Tail-Plane", Jul. 12, 2006.*
Moffitt, Blake A. et al., "Design and Performance Validation of a Fuel Cell Unmanned Aerial Vehicle", Jan. 9-12, 2006, 44th AIAA Aerospace Sciences Meeting and Exhibit, Reno, Nevada, American Institute of Aeronautics and Astronautics, Inc.*
Colson, Benoit et al., "Composite Panel Optimization with Nonlinear Finite Element Analysis and Semi-Analytical Sensitivities", Nov. 6-7, 2007, NAFEMS Seminar: Simulating Composite Materials and Structures, Bad Kissingen, Germany.*
Preator, Robin, "Conceptual Design Studies of a Mono Tiltrotor", 2005, University of Maryland, College Park, pp. 10-13, 145-148.*

(Continued)

*Primary Examiner* — David Silver
*Assistant Examiner* — Cedric D Johnson
(74) *Attorney, Agent, or Firm* — Ladas & Parry LLP

(57) ABSTRACT

A method of designing an aircraft component formed by a number of elements that includes a phase to estimate the effect of a variation of a design variable on the component weight which method includes the following steps: a) providing the main primary structure basic data of the aircraft component and the Reserve Factors associated to its design criteria; b) obtaining a breakdown of the component weight by such design criteria using a fictitious weight calculated taking into account the relative importance of their critical design criteria; c) obtaining the weight effect of a design variable variation, recalculating firstly the new Reserve Factors using suitable functions for the variation of the Reserve Factors vs. the variation of the design variable and, secondly, recalculating the component weight using suitable functions for the variation of the element dimensions vs. the variation of the Reserve Factors.

1 Claim, 4 Drawing Sheets

(56) References Cited

OTHER PUBLICATIONS

Colozza, Anthony J., "Preliminary Design of a Long-Endurance Mars Aircraft", Apr. 1990, Sverdrup Technology, Inc., Lewis Research Center Group, NASA.*

Herencia, J. Enrique et al., "Local Optimization of Long Anisotropic Laminated Fibre Composite Panels with T Shape Stiffeners", May 1-4, 2006, 47th AIAA/ASME/ASCE/AHS/ASC Structures, Structural Dynamics, and Materials Conference.*

McKnight, Christopher William, "Design and Safety Analysis of an In-Flight, Test Airfoil", Aug. 2006, Office of Graduate Studies, Texas A&M University, pp. 1-3.*

International Search Report dated Apr. 6, 2010 for Application No. PCT/ES2009/070634.

* cited by examiner

METHODS FOR ESTIMATING THE EFFECT OF VARIATIONS OF DESIGN VARIABLES ON THE WEIGHT OF AN AIRCRAFT COMPONENT

FIELD OF THE INVENTION

The present invention refers to methods for estimating the effect of the variation of design variables on the weight of an aircraft component and more in particular for estimating the effect of variations of material properties.

BACKGROUND OF THE INVENTION

Estimating the weight impact due to a variation of a design variable, particularly a material property, is a very common work performed in the design phase of an aircraft when the designer search for an optimized structure. Material improvements can drastically reduce the structural weight and, therefore, diminish the operating costs of the aircraft. Thus, the improvement of the mechanical properties of the manufacturing materials of aircrafts, particularly composite materials, is a permanent goal for aircraft manufacturers. In fact, huge amounts of money are invested in material research.

However, material improvements will not necessary lead to significant weight reductions. The final weight of a component is the addition of its structural weight and its non-structural weight. The structural weight is driven by the final thickness of its structural elements. From one side, this thickness is related to the structural failures cases that are driven by the material properties, but they are also driven by other requirements that are independent of material properties, so it is difficult to establish a direct relation between the material properties and the structural and overall final weight. Interaction among different failure modes, design constraints, manufacturability and other factors make the relation between material properties and weight difficult to analyze. For instance, if a thin walled structure is sized with a minimum manufacturable thickness, whatever improvement of the Young's module of the material will not have any impact in the structure weight.

Therefore, before launching a campaign for any material improvement a previous analysis would be desirable to avoid spending a lot of money without obtaining the expected weight reduction. However a detailed analysis of the structure for each possible configuration of the material is so expensive than sometimes the investment becomes unacceptable. Consequently the decisions regarding material improvement programs not always are supported by technical reasons.

The present invention is intended to solve this drawback.

SUMMARY OF THE INVENTION

It is an object of the present invention to provide methods for estimating the effect of the variation of design variables on the weight of an aircraft component at reasonable costs.

It is another object of the present invention to provide methods for estimating the effect of the variation of design variables on the weight of an aircraft component without recalculating a new detailed sizing.

These and other objects are met by providing a method of designing an aircraft component formed by j elements that includes a phase to estimate the effect of a variation of a design variable on the component weight comprising the following steps:

a) Providing the main primary structure basic data of the aircraft component and the Reserve Factors (RFij) associated to its design criteria i.

b) Obtaining a breakdown of the component weight by said design criteria.

c) Obtaining the weight effect of a design variable variation.

In a preferred embodiment said step b) includes a sub-step for assigning a fictitious weight (mefRFij) to each element design criteria i as a function of the element j weight (meaj) and a parameter n able to determine which criteria from RF>1 can be considered without effect on weight according to the following equation:

$$mefRF_{ij} = mea_j \cdot \frac{1}{\left(\frac{RF_{ij}}{RF_{jmin}}\right)^n}.$$

Hereby a breakdown of the component weight that takes into account the relative importance of the critical design criteria is achieved facilitating the further calculation of the effect of the variation of design variables on the weight of an aircraft component.

In another preferred embodiment said step c) includes a first sub-step for recalculating the Reserve Factors (RFij) using suitable functions regarding the relation between the variation of said Reserve Factors (RFij) and the variation of said design variable and a second sub-step for recalculating the component weight using suitable functions regarding the relation between the variation of the element dimensions and the variation of said Reserve Factors (RFij). Hereby an extrapolation of the design criteria weights for the variation of design variables using said functions is facilitated, allowing the estimation of the effect of the variation of design variables on the weight of an aircraft component without recalculating a new detailed sizing.

In another preferred embodiment, said design variable in one of the following: a material property, a minimum manufacturable thickness, a load applied to the aircraft component. Hereby methods for estimating the effect on the weight of an aircraft component of variations of relevant design variables are achieved.

Other characteristics and advantages of the present invention will be clear from the following detailed description of embodiments illustrative of its object in relation to the attached figures.

DETAILED DESCRIPTION OF THE INVENTION

Figure 1:
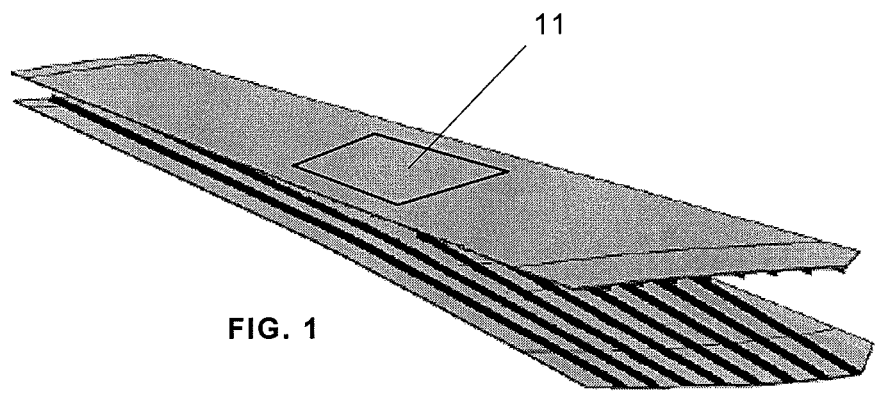
FIG. 1 shows an aircraft component in the torsion box of an horizontal tail plane which is used as an example in the description of a preferred embodiment of this invention.

The weight of an aircraft component made in a given material such a composite material or a metallic material is greatly dependant of its structural element dimensions. Those dimensions are driven by different design criteria, some of which are related to the mechanical properties of the materials like maximum allowable strength, allowable deformations or stability. Other criteria are independent of the mechanical properties of the material like minimum manufacturable thickness, reparability or manufacturing simplicity.

As there is no a direct relationship between weight and the main design criteria it is difficult to estimate the effect on weight of a variation in a given design variable. Thus, the aim of this invention is to provide simple methods to evaluate the influence on the aircraft component weight of any variation of material properties or any other variable that could affect any design criteria or a group of them, such a minimum manufacturable thickness criteria or the loads applied to the aircraft component.

The detailed description of this invention will refer to a method for estimating in an aircraft component the effect of a variation of the material properties on the component weight. Similar methods will achieve the same result for the variation of any other design variable as the skilled man will easily understand.

It is important to note that this method is applicable to variations of material properties—or any other design variable—in a range that do not modify the global behaviour and failure modes of the structure under consideration.

In this description, the following terminology will be used.

An aircraft component shall be understood as an aircraft component made of j elements. The full aircraft can be also considered included under this term.

The primary structure of an aircraft component is the aircraft component structure necessary for the aircraft could fly and it is the structure affected by the material properties analysed in this embodiment of the invention. For example, if the aircraft component is an horizontal tail stabilizer (HTP) the HTP torsion box belongs to the primary structure.

The main primary structure is the simplified representation of the primary structure that it is considered in stress analysis.

The secondary structure of an aircraft component includes those elements which would not cause the aircraft destruction in case of failure such as an HTP fairing. It is not affected by the material properties analysed in this embodiment of the invention but shall be taken into account because its contribution to the aircraft component weight.

The method according to the preferred embodiment of the invention comprises three basic steps:

a) Providing the main primary structure basic data of the aircraft component and the Reserve Factors (RFij) associated to its design criteria i.

b) Obtaining a breakdown of the component weight by said design criteria i.

c) Obtaining the weight effect of a design variable variation.

a) Providing the Main Primary Structure Basic Data of the Aircraft Component and the Reserve Factors (RFij) Associated to its Design Criteria i In this step all relevant geometry data, material properties data, and designing criteria data regarding the aircraft component under consideration are provided.

As an example of the aircraft component we will refer along this description to the component 11 shown in FIG. 1 which is a group of primary structure elements of the upper panel of the box of an HTP.

Figure 2:
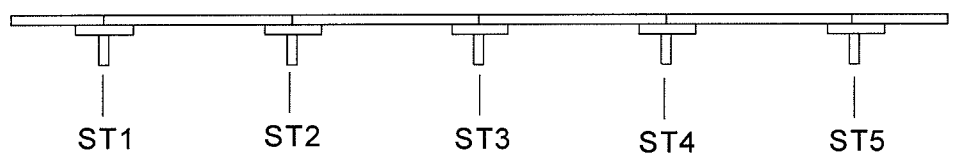
FIG. 2 is a cross section of the aircraft component of FIG. 1.
Figure 3:
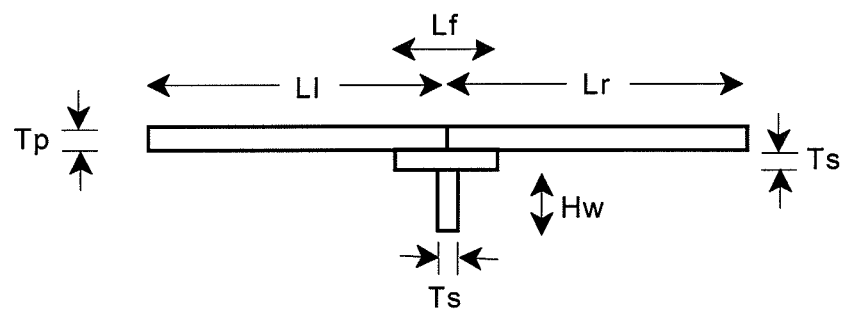
FIGS. 3 and 4 are, respectively, a cross section and a perspective view of a single stiffener panel of the aircraft component of FIG. 1.
Figure 4:
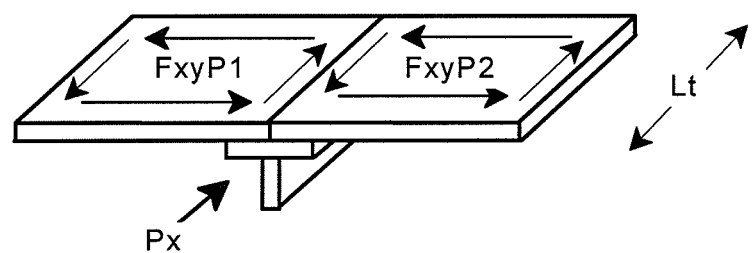

The aircraft component 11 is composed of the five stiffener panels ST1, ST2, ST3, ST4, ST5 shown in FIGS. 2, 3 and 4.

The detailed geometry of these panels is given in the following table.

TABLE 1

| Geometry data (mm) | STR1 | STR2 | STR3 | STR4 | STR5 |
|---|---|---|---|---|---|
| Hw (Height Web) | 40 | 50 | 32 | 50 | 40 |
| Lf (Length Foot) | 55 | 65 | 55 | 65 | 55 |
| Ll (Length Panel Left) | 90 | 90 | 100 | 90 | 90 |
| Lr (Length Panel Right) | 90 | 90 | 100 | 90 | 90 |
| Lt (Total Length) | 600 | 600 | 600 | 600 | 600 |
| Tp (Thickness Panel) | 2.76 | 3 | 3.6 | 3 | 2.76 |
| Ts (Thickness Stringer) | 1.84 | 2 | 1.4 | 2 | 1.84 |

The design criteria taken into account are:

Damage tolerance (DT), local buckling of panels (LBP), local buckling of stiffener web (LBW), column buckling (CB), as design criteria dependant on mechanical properties.

Minimum thickness (MT) as a design criteria independent of mechanical properties.

The associated Reserve Factors of said design criteria are given in the following table.

TABLE 2

| Reserve Factors | DT | LBP | LBW | CB | MT |
|---|---|---|---|---|---|
| ST1 | 1.83 | 1.09073257 | 1.20 | 1.06870033 | 1.5 |
| ST2 | 2.14 | 1.70459419 | 1.06 | 1.01266839 | 1.63043478 |
| ST3 | 2.28 | 1.21269814 | 1.35 | 1.00928461 | 1.95652174 |
| ST4 | 2.14 | 1.70459419 | 1.06 | 1.01266839 | 1.63043478 |
| ST5 | 1.83 | 1.09073257 | 1.20 | 1.06870033 | 1.5 |

Critical loads applied to the panels (see FIG. 4) are shown in the following table.

TABLE 3

| Critical loads | STR1 | STR2 | STR3 | STR4 | STR5 |
|---|---|---|---|---|---|
| Px (N) | −100000 | −100000 | −100000 | −100000 | −100000 |
| FxyP1 (N mm) | 150 | 150 | 150 | 150 | 150 |
| FxyP2 (N mm) | 150 | 150 | 150 | 150 | 150 | b) Obtaining a Breakdown of the Component Weight by Said Design Criteria

The aim of this step is to estimate the amount of the component weight that is driven by each design criteria because the change of a material mechanical property can make that an initial non critical criteria becomes critical and this could affect the final weight of the aircraft component.

A fictitious weight will be used to know which amount of the structure weight is driven by each design criteria. This fictitious weight is calculated from the weight of each main primary structural element taking into account the relative importance of their critical design criteria. The fictitious weight allows estimating the amount of the main primary structure total weight that is driven by each design criteria. Once this fictitious weights are obtained, it will easy to know what are the main design criteria and how they influence the weight of the component because the interactions between weights and design criteria are shown.

Considering, in general terms, that the aircraft component is composed by j main primary elements and that i design criteria are taken into account, the amount of the weight of each element j that is driven by each design criteria i (hereinafter also referred as the Design Criteria Weight) is obtained through the following sub-steps:

b1) Calculation of Total Structural Weight from Main Primary Elements:

$$Mpsa = \sum_j mea_j$$

The weight of each main primary element is calculated from its dimensions and the density of the material. The result of said calculation for the above-mentioned example is shown in the following table.

TABLE 4

|  | STR1 | STR2 | STR3 | STR4 | STR5 | Total |
|---|---|---|---|---|---|---|
| Initial Weight (Kg) | 0.715 | 0.835 | 0.851 | 0.835 | 0.715 | 3.952 | b2) Calculation of Design Criteria Fictitious Weights for Each Element j:

$$mefRF_{ij} = mea_j \cdot \frac{1}{\left(\frac{RF_{ij}}{RF_{jmin}}\right)^n}$$

n is a factor that is able to determine which criteria from RF>1 can be considered without effect on weight:

If n→infinite, only the first main RF is taken into account.

If n→finite, more than the first main RF is taken into account.

Normalization with respect to the critical RF is done so the critical is always 1.0 b3) Calculation of the Fictitious Weight of Each Element j:

$$mef_j = mea_j \cdot \sum_i \frac{1}{\left(\frac{RF_{ij}}{RF_{jmin}}\right)^n}$$

This function allows taking into account not only the effect of critical design criteria but also those design criteria close to the critical. The parameter n is able to determine which criteria from RF>1 can be considered without effect on weight b4) Calculation of Total Fictitious Weight:

$$Mft = \sum_j mef_j$$

b5) Calculation of Design Criteria i Fictitious Weight for Main Primary Structure:

$$MftRF_i = \sum_j mefRF_{ij}$$

b6) Calculation of Design Criteria i Weight for the Main Primary Structure:

$$MpsaRF_i = \frac{MftRF_i}{Mft} \cdot Mpsa$$

b7) Calculation of Design Criteria i Weight for the Primary Structure:

$$MspcRF_i = \frac{MpsaRF_i}{Mpsa} \cdot f(Mspc, Mpsa)$$

f(Mspc, Mpsa) relates to the dependency between Mspc (the weight of the whole primary structure) and Mpsa (the weight of the main primary structure). Typically, this relationship takes the form of a linear function because the weight of the non main primary structure is usually expressed as a percentage of the main primary structure weight. However, any other function can be used if it is required.

b8) Calculation of Design Criteria i Weight for the Structural Part of the Component:

$$MscRF_i = \frac{MspcRF}{Mspc} \cdot f(Msc, Mspc)$$

Again the function f(Msc, Mspc) takes the form that the designer consider more appropriate to express the relationship between Msc (the weight of the structural part of the component) and Mspc (the weight of the whole primary structure).

b9) Calculation of Design Criteria i Weight for the Whole Aircraft Component:

$$McRF_i = \frac{MscRF}{Msc} \cdot f(Mc, Msc)$$

Again the function f(Mc, Msc) takes the form that the designer consider more appropriate to express the relationship between Mc (the weight of the whole aircraft component) and Msc (the weight of the structural part of the component).

The final results of this step in the above-mentioned example are shown in the following table:

TABLE 5

| Design Criteria Weights | DT | LBP | LBW | CB | MT | Total |
|---|---|---|---|---|---|---|
| ST1 | 0.0379 | 0.1634 | 0.1889 | 0.1224 | 0.2028 | 0.7154 |
| ST2 | 0.0291 | 0.1269 | 0.2766 | 0.1260 | 0.2766 | 0.8352 |
| ST3 | 0.0216 | 0.1355 | 0.2478 | 0.1363 | 0.3099 | 0.8511 |
| ST4 | 0.0379 | 0.1269 | 0.2766 | 0.1260 | 0.2766 | 0.8352 |
| ST5 | 0.0379 | 0.1634 | 0.1889 | 0.1224 | 0.2028 | 0.7154 |
| Total | 0.1557 | 0.7160 | 1.1788 | 0.6331 | 1.2687 | 3.9523 |
| % | 3.94% | 18.12% | 29.83% | 16.02% | 32.10% |  |

In view of these results it can be concluded that local buckling (LBP and LBW) is determinant in terms of weight: 29.83%+18.12%=47.95% of the weight is driven by this criteria. Minimum thickness (MT) is also important (32.10% of the weight). Damage tolerance is not very critical in this example (only 3.94% of the weight).

Consequently the most important criteria in terms of weight, i.e. the buckling criteria in this particular case, seems to be the criteria to be considered for a variation in the material properties. As it is well known that the buckling criteria improve with the compression stiffness of the structure, an increase in the elastic modulus (Ex) of the fiber of the composite material should produce a lighter weight. However a great improvement of weight is not to be expected because the minimum thickness criteria has an important influence and thickness can not be reduced very much.

c) Obtaining the Weight Effect of a Design Variable Variation.

In this step the weight effect of a material property variation (such as the above-mentioned increase of the elastic modulus of the fiber of the composite material) is obtained by means of an extrapolation of the design criteria weights resulting from the previous step in two sub-steps:

c1) Recalculating the Reserve Factors (RFij) Using Suitable Functions Regarding the Relation Between the Variation of Said Reserve Factors (RFij) and the Variation of the Material Property.

Figure 5:
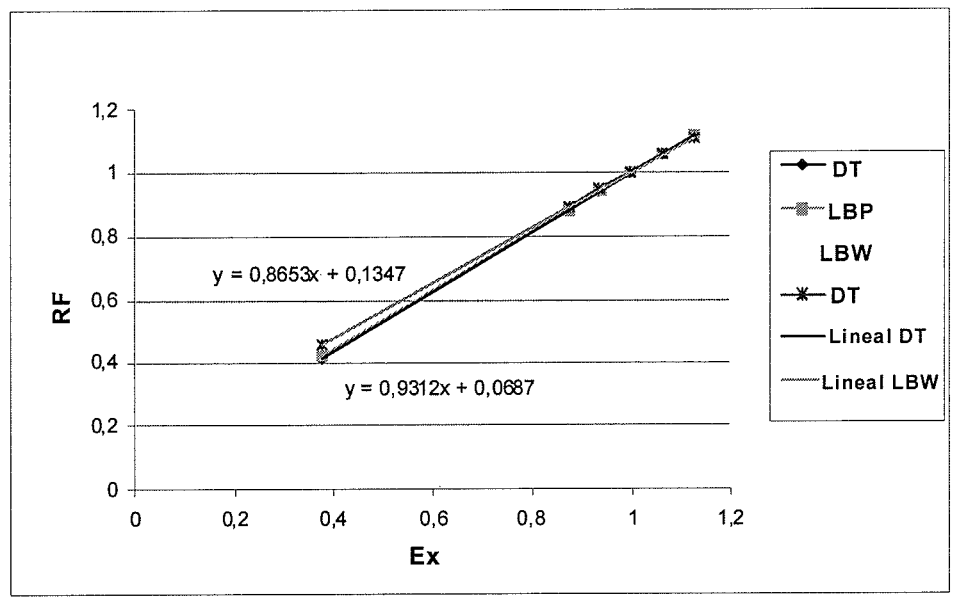
FIG. 5 show the variation of the Reserve Factors (RF) corresponding to two Design Criteria vs. the variation of the Elastic Module (Ex) of the material.
Figure 6:
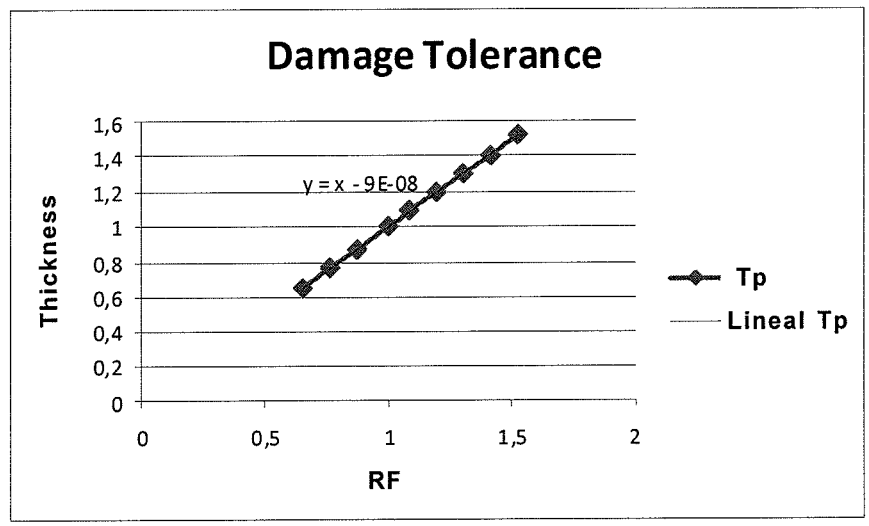
FIGS. 6, 7, 8 and 9 show curves representing the variation of the element thickness vs. the variation of the Reserve Factor (RF) associated to four Design Criteria.
Figure 7:
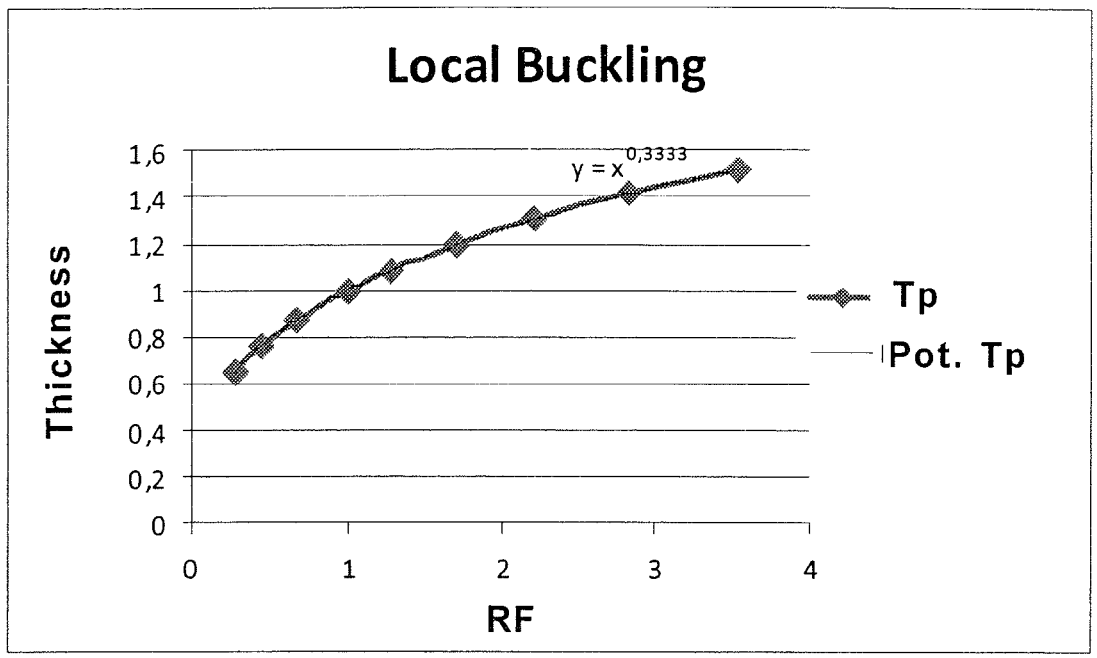
Figure 8:
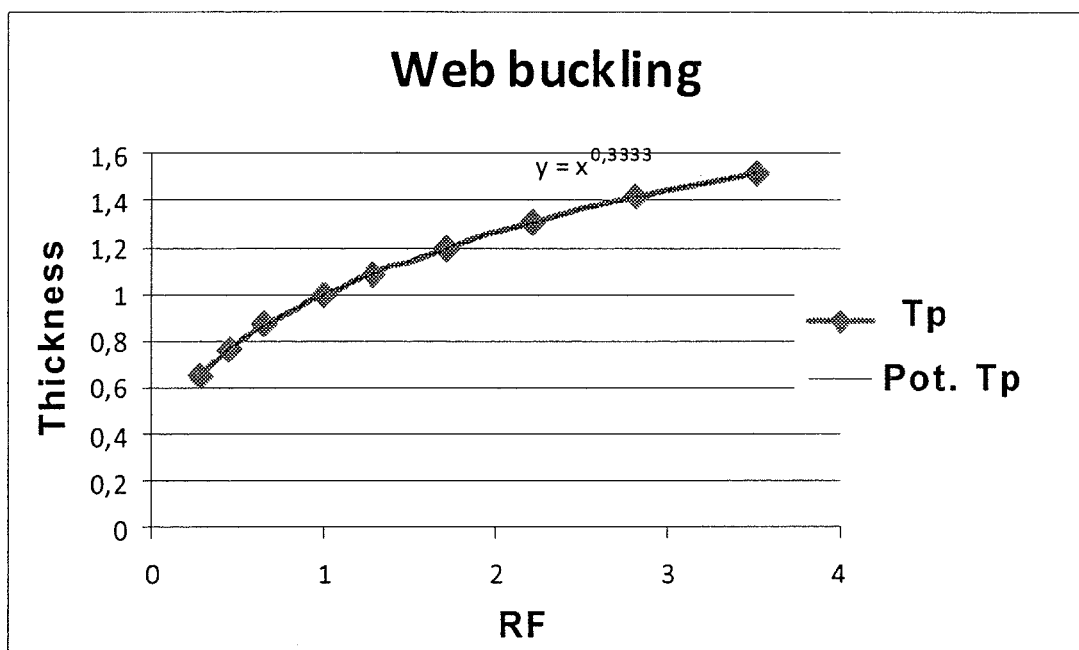
Figure 9:
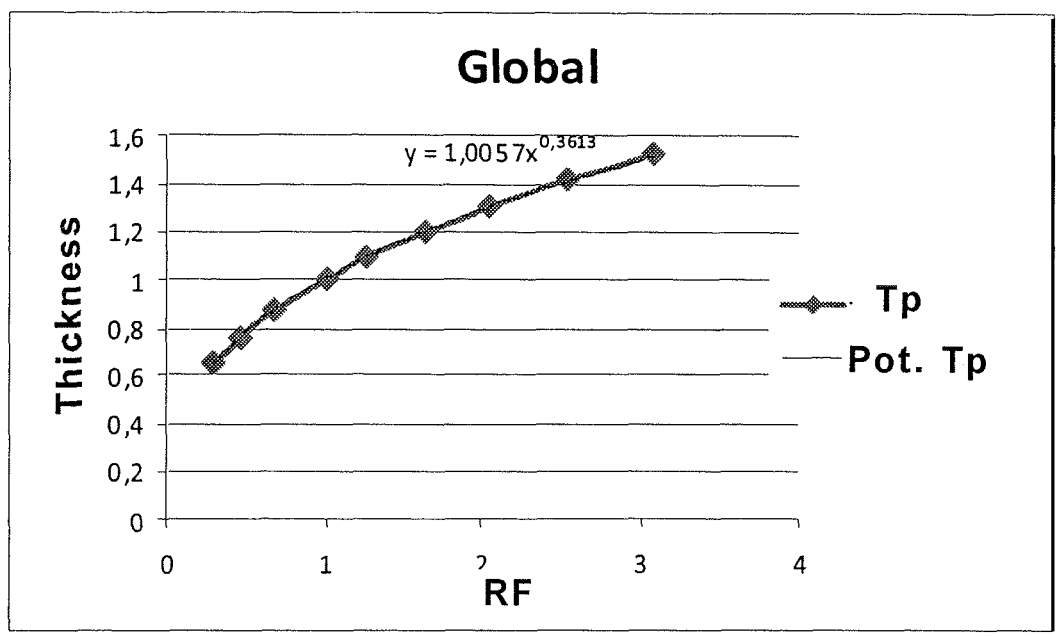

The two lineal functions shown in FIG. 5 are functions regarding the variation of the Reserve Factors (RF) corresponding to two Design Criteria and the variation of the Elastic Module (Ex) of the material. In the rest of Design Criteria the Reserve Factors (RF) also grows proportionally to the Elastic Module (Ex).

With an improvement of 12% on the Elastic Module and using said functions the new Reserve Factors (RFi) shown in the following table are obtained:

TABLE 6

| New Reserve Factors | DT | LBP | LBW | CB | MT |
|---|---|---|---|---|---|
| ST1 | 2.05 | 1.22604886 | 1.34 | 1.19199985 | 1.5 |
| ST2 | 2.41 | 1.91606614 | 1.19 | 1.12950331 | 1.63043478 |
| ST3 | 2.56 | 1.36314547 | 1.52 | 1.12572914 | 1.95652174 |
| ST4 | 2.41 | 1.91606614 | 1.19 | 1.12950331 | 1.63043478 |
| ST5 | 2.05 | 1.22604886 | 1.34 | 1.19199985 | 1.5 | c2) Recalculating the Component Weight Using Suitable Functions Regarding the Relation Between the Variation of the Element Dimensions and Said Reserve Factors (RFij)

FIGS. 6, 7, 8 and 9 show relations between the variation of the element thickness and the variation of the Reserve Factors (RF) associated to four Design Criteria. In all cases there is an inverse proportional relation between those variables.

It can be also considered that the inverse proportional relationship is discrete due to the discrete steps on composite properties due to the finite steps of thickness on composite plies. A certain penalty threshold due to these discrete steps can be added at this relationship that if the improvement of material is below this threshold the weight of the component is not affected.

Using these relations the following variation of weight are obtained:

TABLE 7

| New Design Criteria Weights | DT | LBP | LBW | CB | MT | Total |
|---|---|---|---|---|---|---|
| ST1 | 0.0337 | 0.1571 | 0.1817 | 0.1170 | 0.2028 | 0.6923 |
| ST2 | 0.0259 | 0.1220 | 0.2660 | 0.1204 | 0.2766 | 0.8110 |
| ST3 | 0.0192 | 0.1303 | 0.2383 | 0.1303 | 0.3099 | 0.8281 |
| ST4 | 0.0259 | 0.1220 | 0.2660 | 0.1204 | 0.2766 | 0.8110 |
| ST5 | 0.0337 | 0.1571 | 0.1817 | 0.1170 | 0.2028 | 0.6923 |
| Total | 0.1385 | 0.6887 | 1.1337 | 0.60551 | 1.2687 | 3.835 |
| % | 3.50% | 17.42% | 28.69% | 15.31% | 32.10% | |

In view of this results it can be concluded that in the example under consideration an improvement of 12% on the Elastic Module (Ex) is producing a reduction of weight in the selected structural elements of only 3% (3,835 Kg. against 3,9523 Kg). This is a counter-intuitive conclusion because in principle a higher reduction was expected due to the great improvement of the material (12%). The method shows that the weight reduction is not important because of the great influence of the minimum thickness criteria and consequently that any effort to improve the material Elastic Module would not be justified.

The two type of functions used in this step are based on the global objective of producing a safe structure with the minimum weight, so they follow the principle of modifying the dimensions to lead the RFi to the minimum safe its value (normally close to 1.0 for minimum weight). Following this objective no structure weight is added unnecessary.

This method can be applied component by component up to total aircraft level and the resulting information can help the aircraft manufacturing companies to establish the requirements for improvement of materials to be used in future aircrafts. In this way reduction weight could be known "a priori", and material enhancement efforts could be oriented in the more efficient way.

Modifications may be introduced into the preferred embodiment just set forth, which are comprised within the scope defined by the following claims.

The invention claimed is:

1. A method of designing an aircraft component formed by a number of elements (j), including a phase to estimate the effect of a variation of a design variable on the component weight, said method comprising the following steps:
   a) providing main primary structure basic data of the aircraft component and Reserve Factors (RFij) associated to its design criteria (i);
   b) obtaining a breakdown of the component weight by said design criteria (i);
   c) obtaining the weight effect of a design variable variation, wherein step b) includes a sub-step for assigning a fictitious weight (mefRFij) to each element design criteria (i) as a function of the weight (meaj) of each element (j) and of a parameter (n) able to determine which criteria from RF>1 can be considered without effect on weight according to the following equation:

$$mefRF_{ij} = mea_j \cdot \frac{1}{\left(\frac{RF_{ij}}{RF_{jmin}}\right)^n},$$

d) manufacturing an aircraft component, based on the method above.

* * * * *